(12) United States Patent
Zhao et al.

(10) Patent No.: US 9,284,229 B2
(45) Date of Patent: Mar. 15, 2016

(54) CARBON COMPOSITES, METHODS OF MANUFACTURE, AND USES THEREOF

(71) Applicants: Lei Zhao, Houston, TX (US); Zhiyue Xu, Cypress, TX (US)

(72) Inventors: Lei Zhao, Houston, TX (US); Zhiyue Xu, Cypress, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 86 days.

(21) Appl. No.: 14/103,095

(22) Filed: Dec. 11, 2013

(65) Prior Publication Data

US 2015/0158772 A1    Jun. 11, 2015

(51) Int. Cl.
*C04B 35/52* (2006.01)
*C04B 35/56* (2006.01)
*C04B 35/536* (2006.01)
*C04B 35/634* (2006.01)
*C04B 35/65* (2006.01)

(52) U.S. Cl.
CPC ............. *C04B 35/536* (2013.01); *C04B 35/634* (2013.01); *C04B 35/65* (2013.01); *C04B 2235/3409* (2013.01); *C04B 2235/3418* (2013.01); *C04B 2235/3817* (2013.01); *C04B 2235/3821* (2013.01); *C04B 2235/3826* (2013.01); *C04B 2235/3843* (2013.01); *C04B 2235/3847* (2013.01); *C04B 2235/402* (2013.01); *C04B 2235/404* (2013.01); *C04B 2235/405* (2013.01); *C04B 2235/407* (2013.01); *C04B 2235/421* (2013.01); *C04B 2235/422* (2013.01); *C04B 2235/428* (2013.01); *C04B 2235/80* (2013.01)

(58) Field of Classification Search
CPC .... C04B 35/565; C04B 35/563; C04B 35/56; C04B 35/5607; C04B 35/52; C04B 35/522; C04B 35/536
USPC .......................................... 501/87, 88, 90, 91
See application file for complete search history.

(56) References Cited

U.S. PATENT DOCUMENTS

| | | | | |
|---|---|---|---|---|
| 4,234,638 | A | * | 11/1980 | Yamazoe et al. ............... 428/133 |
| 4,798,771 | A | * | 1/1989 | Vogel ............................. 428/564 |
| 4,799,956 | A | * | 1/1989 | Vogel ............................... 75/243 |
| 4,826,181 | A | | 5/1989 | Howard |
| 5,247,005 | A | | 9/1993 | Von Bonin et al. |
| 6,105,596 | A | | 8/2000 | Hoyes et al. |
| 7,470,468 | B2 | | 12/2008 | Mercuri et al. |
| 2002/0114952 | A1 | * | 8/2002 | Ottinger et al. ............... 428/413 |
| 2004/0097360 | A1 | * | 5/2004 | Benitsch et al. ................ 501/99 |
| 2004/0127621 | A1 | | 7/2004 | Drzal et al. |
| 2013/0001475 | A1 | * | 1/2013 | Christ et al. ................... 252/500 |

OTHER PUBLICATIONS

Etter et al., "Aluminum carbide formation in interpenetrating graphite/aluminum composites", Materials Science and Engineering, Mar. 15, 2007, vol. 448, No. 1, pp. 1-6.

(Continued)

*Primary Examiner* — Noah Wiese
(74) *Attorney, Agent, or Firm* — Cantor Colburn LLP

(57) ABSTRACT

A carbon composite contains a plurality of expanded graphite particles; and a second phase comprising a carbide, a carbonization product of a polymer, or a combination thereof; wherein the second phase bonds at least two adjacent basal planes of the same expanded graphite particle together. Methods of making the carbon composite and articles comprising the carbon composite are also disclosed.

26 Claims, 5 Drawing Sheets

(56) References Cited

OTHER PUBLICATIONS

International Search Report and Written Opinion; International Application No. PCT/US2014/065389; International Filing Date: Nov. 13, 2014; Date of Mailing: Mar. 18, 2015; 15 pages.

Yang et al., "Effect of tungsten addition on thermal conductivity of graphite/copper composites", Composites Part B: Engineering, May 31, 2013, vol. 55, pp. 1-4.

Pohlmann et al., "Magnesium alloy-graphite composites with tailored heat conduction properties for hydrogen storage applications", International Journal of Hydrogen Energy, 35 (2010), pp. 12829-12836.

Tikhomirov et al., "The chemical vapor infiltration of exfoliated graphite to produce carbon/carbon composites", Carbon, 49 (2011), pp. 147-153.

* cited by examiner

CARBON COMPOSITES, METHODS OF MANUFACTURE, AND USES THEREOF

BACKGROUND

This disclosure is directed to carbon composites, and in particular to carbon composites comprising expanded graphite, their methods of manufacture, and articles formed therefrom.

Elastomers are relatively soft and deformable, thus have been widely used in seals, adhesives, and molded flexible parts. Elastomers have also been used as sealing materials in downhole applications. However, as oil and gas production activities continue to shift toward more hostile and unconventional environments, the performance of elastomers becomes less than satisfactory as they are susceptible to decomposition under harsh conditions, posing limits for heavy oil exploration.

Metals have been proposed as alternative sealing materials for downhole applications due to their high corrosion resistance and excellent high pressure and high temperature tolerance. However, metals have low ductility and low elasticity. Accordingly, metals are less effective in sealing rough casing surfaces as compared to elastomers.

Carbon materials such as flexible graphite could be one of the promising alternative sealing materials to replace elastomers or metals due to their high thermal and chemical stability, flexibility, compressibility, and conformability. However, certain carbon materials may have weak mechanical strength affecting the structural integrity of the element and tools comprising these materials.

Therefore, there remains a need in the art for sealing materials that have a good balance of properties such as stability, elasticity, and mechanical strength.

BRIEF DESCRIPTION

In an embodiment, a carbon composite comprises a plurality of expanded graphite particles; and a second phase comprising a carbide, a carbonization product of a polymer, or a combination thereof; wherein the second phase bonds at least two adjacent basal planes of the same expanded graphite particle together.

In another embodiment, a method of forming a carbon composite comprises: compressing a combination comprising expanded graphite particles and a filler to provide a pre-form; and heating the pre-form to a temperature which is 20° C. to 100° C. higher than the melting point of the filler to form a second phase bonding at least two adjacent basal planes of the same expanded graphite particle together.

In yet another embodiment, a method for the manufacture of a carbon composite comprises: providing a plurality of expanded graphite particles; depositing a filler on a basal plane of an expanded graphite particle through vapor deposition to provide a filled-expanded graphite; compressing the filled-expanded graphite to provide a pre-form; and heating the pre-form to form a second phase bonding at least two adjacent basal planes of the same expanded graphite particle together.

In still another embodiment, a method of forming a carbon composite comprises: compressing a combination comprising expanded graphite particles, a filler, a crosslinkable polymer, and a crosslinker to provide a pre-form; crosslinking the crosslinkable polymer with the crosslinker to provide a composition comprising a crosslinked polymer; and heating the composition to form a carbonization product derived from the crosslinked polymer; wherein the carbonization product bonds at least two adjacent basal planes of the same expanded graphite particle together; and the carbonization product further bonds at least one basal plane of a graphite particle with at least one basal plane of a different graphite particle.

An article comprising the carbon composite is also disclosed.

BRIEF DESCRIPTION OF THE DRAWINGS

The following descriptions should not be considered limiting in any way. With reference to the accompanying drawings, like elements are numbered alike.

DETAILED DESCRIPTION

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms are usually referred to as basal planes. Accordingly, graphites may be characterized as laminated structures of carbon.

The basal planes of graphite are held together by weak van der Waals forces. Graphites, especially natural graphites, can be treated so that the spacing between the superposed carbon layers or laminae can be appreciably opened up so as to provide a marked expansion in the direction perpendicular to the layers, thus form an expanded graphite structure in which the laminar character of the carbon layers is substantially retained.

In considering the graphite or expanded graphite structure, two axes or directions are usually noted: the "c" axis or direction and the "a" axes or directions. The "c" axis or direction may be considered as the direction perpendicular to the carbon layers. The "a" axes or directions may be considered as the directions parallel to the carbon layers or the directions perpendicular to the "c" direction.

Figures 1A, 1B, 1C:
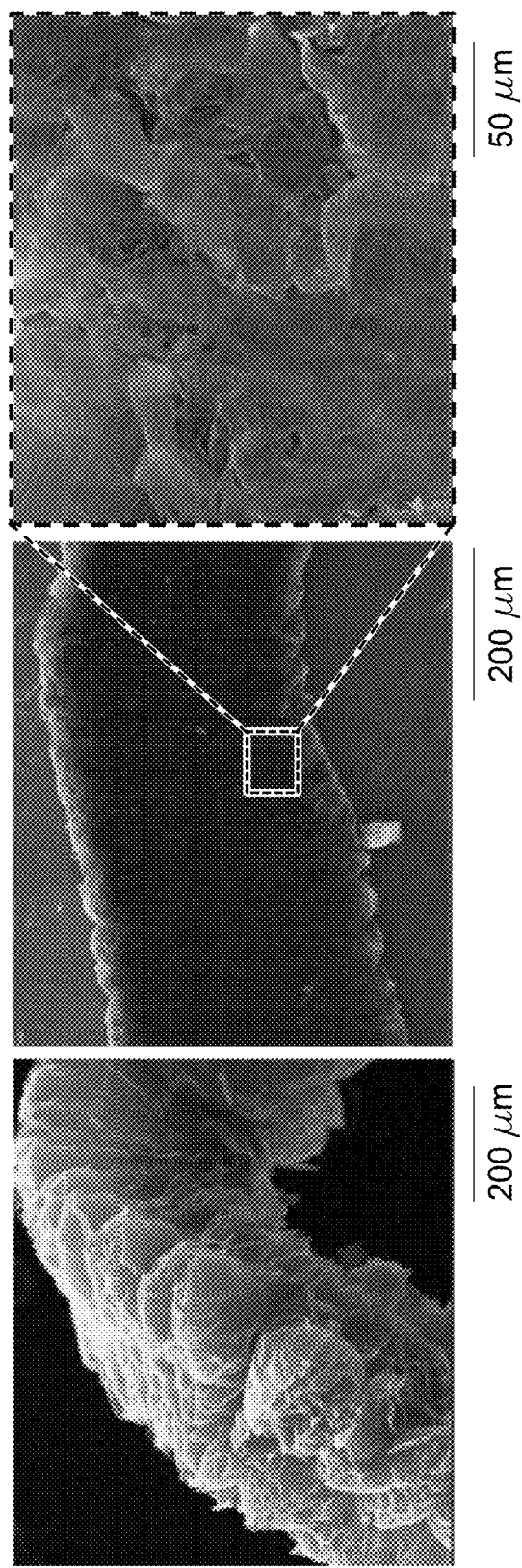
FIGS. 1(a)-1(c) are scanning electron microscopic ("SEM") images of an expanded graphite structure before (1(a)) and after (1(b) and 1(c)) compression.

The expanded graphite particles are vermiform in appearance, and are therefore commonly referred to as worms. FIG. 1(a) is a microscopic ("SEM") image of an expanded graphite structure. As shown in FIG. 1(a), the expanded graphite comprises parallel basal planes perpendicular to the axis of the worm.

The worms may be compressed together into articles, which unlike the original graphite, are flexible, and have good elastic properties. However, during compression, these worm-like particles collapse and are orientated in such a way that the basal planes of the expanded graphite particles are substantially perpendicular to the compression direction. Without wishing to be bound by theory, it is believed that there are only weak Van de Waals forces exist between basal planes within an expanded graphite particle, and there are no forces exist between basal planes of different expanded graphite particles, thus the expanded graphite bulk MATERI- ALS HAVE WEAK MECHANICAL STRENGTH. FIGS. (1b) and (1c) are SEM images of an expanded graphite structure after compression.

Figure 2:
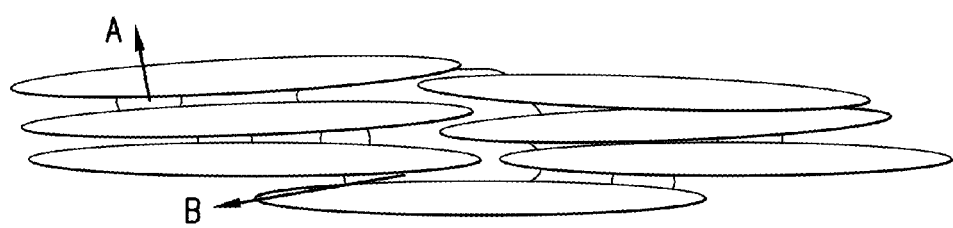
FIG. 2 is a schematic illustration of exemplary mechanisms to enhance the mechanical strength of expanded graphite.

Applicants have found methods to improve the mechanical strength of expanded graphite bulk materials. Advantageously, the methods enhance the mechanical strength of the expanded graphite at the basal plane level by introducing a second phase into the worm-like structure of expanded graphite rather than onto the surface of the structure. The second phase can bond basal planes within one expanded graphite particle as illustrated as mechanism A in FIG. 2. Alternatively, the second phase bonds basal planes of the same graphite particle as well as basal planes of different graphite particles. This mechanism is illustrated in FIG. 2 as mechanism B.

One way of forming a second phase at the basal plane level is to compress a combination comprising expanded graphite particles and a filler to provide a pre-form; and to heat the pre-form to a temperature which is 20° C. to 100° C. higher than the melting point of the filler thus forming a second phase bonding at least two adjacent basal planes of the same expanded graphite particle together.

The expanded graphite can be synthesized by chemical intercalation of natural graphite and sudden expansion at high temperature. In an embodiment, the expanded graphite is produced through the steps of: treating a graphite material such as natural graphite, kish graphite, pyrolytic graphite, etc., with sulfuric acid, nitric acid, chromic acid, boric acid, or halides such as $FeCl_3$, $ZnCl_2$, $SbCl_5$, to form an expandable graphite; and rapidly heating the expandable graphite at a high temperature of, e.g., 800° C. or higher, so as to generate pyrolysis gas whose pressure is used to expand a space between graphite layers thereby forming the expanded graphite.

The expanded graphite particles can have any shape or size suitable for their intended use. As used herein, "graphite particles" includes graphite grains, graphite flakes, or graphite crystals.

The expanded graphite particles are mixed evenly with a filler to provide a combination. The mixing can be accomplished by any known mixing method to thoroughly disperse the filler throughout the graphite particles. Exemplary filler includes $SiO_2$, Si, B, $B_2O_3$, or a metal or an alloy. The metal can be aluminum, copper, titanium, nickel, tungsten, chromium, or iron. The alloy includes the alloys of aluminum, copper, titanium, nickel, tungsten, chromium, or iron. One exemplary alloy is steel. These materials can be in different shapes, such as particles, fibers, and wires. Combinations of the materials can be used.

In the combination, the expanded graphite particles is present in an amount of 25 wt. % to 95 wt. % or 50 wt. % to 80 wt. %, based on the total weight of the combination. The filler is present in an amount of 5 wt. % to 75 wt. % or 20 wt. % to 50 wt. %, based on the total weight of the combination.

Next, the combination comprising the expanded graphite particles and the filler is compressed to provide a pre-form. Optionally the pre-form comprises pores. After the filler is melted, the filler can fill the pores and maximize its contact with the expanded graphite particles.

The pre-form can be heated at a temperature that is 20° C. to 100° C. higher or 20° C. to 50° C. higher than the melting point of the filler for 30 minutes to 3 hours. The heating can be conducted at an atmospheric pressure or at a super-atmospheric pressure of 5,000 psi to 30,000 psi. The heating can also be conducted under an inert atmosphere, for example, under argon or nitrogen. The means of heating is not particularly limited. In an embodiment, the heating is conducted in an oven.

Without wishing to be bound theory, it is believed that under the process conditions, the filler penetrates the walls of the worm-like structures of expanded graphite particles and reacts with the carbon of expanded graphite forming a carbide thus bonding the basal planes together. The filler can also be present at the boundaries of different expanded graphite particles. Thus the second phase can further bond at least one basal plane of a graphite particle with at least one basal plane of a different graphite particle. In an embodiment, the second phase is a continuous matrix holding different graphite particles as well as the basal planes of the same graphite particle together.

The second phase can comprise a metallic carbide, for example, a carbide of aluminum, titanium, nickel, tungsten, chromium, iron, an aluminum alloy, a copper alloy, a titanium alloy, a nickel alloy, a tungsten alloy, a chromium alloy, or an iron alloy. These carbides are formed by reacting the corresponding metal or metal alloy with the basal plane carbon of the expanded graphite. The second phase can also comprise SiC formed by reacting $SiO_2$ or Si with the carbon of expanded graphite, or $B_4C$ formed by reacting B or $B_2O_3$ with the carbon of expanded graphite. The second phase can comprise a combination of these carbides when a combination of filler materials is used.

Figure 3:
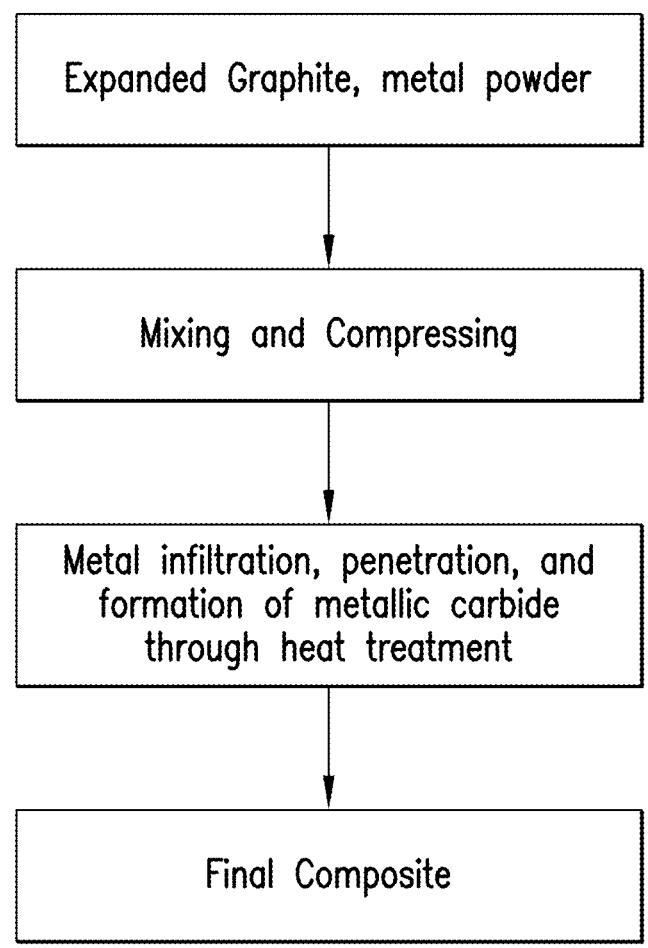
FIG. 3 is a flow chart illustrating the formation of a carbon composite via a thermal diffusion process.

An exemplary scheme to prepare a carbon composite according to this method is illustrated in FIG. 3. As shown in FIG. 3, expanded graphite and metal power is mixed and compressed to form a pre-form. Then the pre-formed is heated causing the metal to be disposed between the basal planes of the same graphite particle as well as the basal planes of different graphite particles through infiltration and penetration. The heat treatment also causes the metal to react with the carbon of the expanded graphite thus forming the final composite.

In another embodiment, a method for the manufacture of a carbon composite comprises providing a plurality of expanded graphite particles; depositing a filler on a basal plane of an expanded graphite particle through vapor deposition to provide a filled-expanded graphite; compressing the filled-expanded graphite to provide a pre-form; and heating the pre-form to form a second phase bonding at least two adjacent basal planes of the same expanded graphite particle together.

The expanded graphite and the filler have been described hereinabove. The filler can be deposited on the basal planes of an expanded graphite particle by vapor deposition. A "vapor deposition" process refers to a process of depositing materials on a substrate through the vapor phase. Vapor deposition processes include physical vapor deposition, chemical vapor deposition, atomic layer deposition, laser vapor deposition, and plasma-assisted vapor deposition. Examples of the filler precursors include triethylaluminum and nickel carbonyl. Different variations of physical deposition, chemical deposition, and plasma-assisted vapor deposition can be used. Exemplary deposition processes can include plasma assisted chemical vapor deposition, sputtering, ion beam deposition, laser ablation, or thermal evaporation. Without wishing to be bound by theory, it is believed that the worm-like structure of expanded graphite is a highly porous structure with strong absorption capacity, thus the filler precursor gases can diffuse through the worm wall and form the filler deposited on the basal planes of the expanded graphite.

The vapor deposition provides a filled-expanded graphite, which can be in the form of a powder. The filled-expanded graphite can be compressed to form a pre-form. The pre-form is then heated to allow the filler to react with the carbon of the expanded graphite thus forming a second phase holding the basal planes of an expanded graphite particle together.

In an embodiment, the heating temperature is higher than the melting point of the filler. Under this circumstance, the second phase comprises carbides formed by liquid phase bonding. Alternatively, the heating temperature is 50-100° C. lower than the melting point of the filler. The second phase comprises carbides formed by solid phase bonding. In an embodiment, the heating temperature is 600° C. to 1000° C. The heating can be conducted at an atmospheric pressure or at a super-atmospheric pressure of 5,000 psi to 30,000 psi. The heating can also be conducted under an inert atmosphere, for example, under argon or nitrogen.

The amount of the filler in the carbon composite can vary depending on the concentration of the deposition material, the vapor deposition temperature, and the time that the expanded graphite is left in a vapor deposition reactor. The filler can be present in an amount of 2 wt. % to 50 wt. % or 10 wt. % to 25 wt. %, based on the total weight of the carbon composite. The expanded graphite can be present in an amount of 50 wt. % to 98 wt. % or 75 wt. % to 90 wt. %, based on the total weight of the carbon composite.

Figure 4:
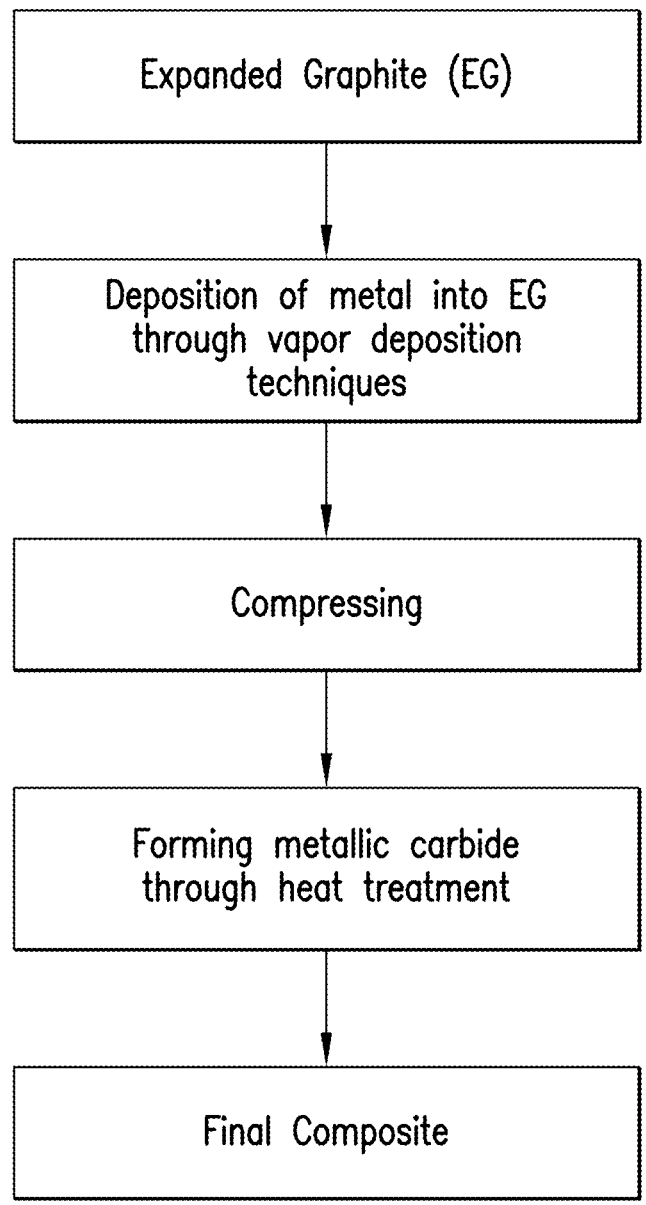
FIG. 4 is a flow chart illustrating the formation of a carbon composite via a vapor deposition process.

An exemplary scheme to prepare a carbon composite according to this method is illustrated in FIG. 4. As shown in FIG. 4, metal is deposited on the basal planes of expanded graphite through vapor deposition techniques. After compressing, the pre-form is heated causing metal to react with carbon of the expanded graphite thus forming the final composite.

Figure 5:
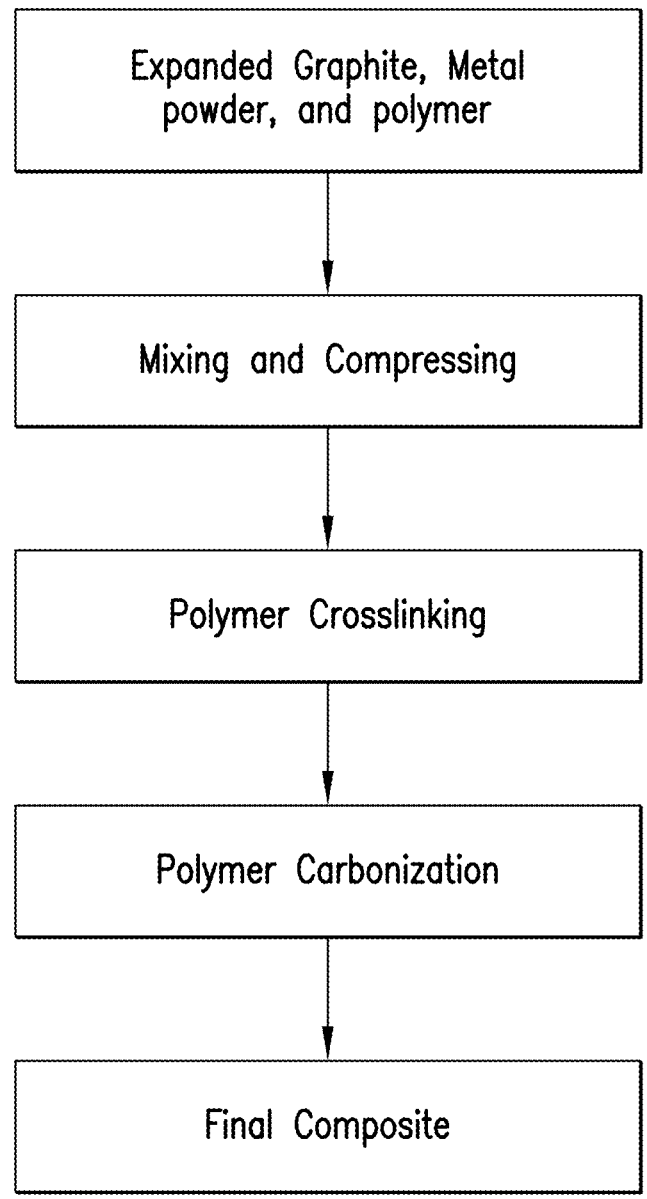
FIG. 5 is a flow chart illustrating the formation of a carbon composite via polymer carbonization.

A method for the manufacture of a carbon composite can also comprise compressing a combination comprising expanded graphite particles, a filler, a crosslinkable polymer, and a crosslinker to provide a pre-form; crosslinking the crosslinkable polymer with the crosslinker to provide a composition comprising a crosslinked polymer; heating the composition to form a carbonization product of the crosslinked polymer; wherein the carbonization product bonds at least two adjacent basal planes of the same expanded graphite particle together; and the carbonization product further bonds at least one basal plane of a graphite particle with at least one basal plane of a different graphite particle. An exemplary scheme to prepare a carbon composite according to this method is illustrated in FIG. 5.

The crosslinkable polymer is selected from a polyphenol, polyacrylonitrile, an epoxy resin, a rayon, a pitch, or a combination comprising at least one of the foregoing. Exemplary crosslinkers include amines, cyclic acid anhydrides, and the like. The combination can comprise 2 wt. % to 50 wt. % of the crosslinkable polymer, 2 wt. % to 20 wt. % of the filler, and 30 wt. % to 96 wt. % of the expanded graphite particles.

The crosslinking conditions can vary depending on the specific crosslinkable polymer and the crosslinker used. In an embodiment, the crosslinking is conducted at a temperature of 50° C. to 300° C., specifically 100° C. to 200° C.

The composition comprising the crosslinked polymer, the expanded graphite particles, and the filler can be heated to a temperature of 700° C. to 1,200° C., specifically 800° C. to 1,000° C., under which temperature, the crosslinked polymer forms a carbonization product bonding the basal planes of the expanded graphite together.

As used herein, "carbonization" refers to the conversion of a polymer into carbon and/or a carbon-containing residue. A "carbonization product" refers to an amorphous carbon and/or a carbon-containing residue. By converting the crosslinked polymer into a carbonization product, the basal planes are bonded together through carbon-carbon bonds.

The disclosure also provides a carbon composite made by the above described methods. The composite comprises a plurality of expanded graphite particles; and a second phase comprising a carbide, a carbonization product of a polymer, or a combination thereof; wherein the second phase bonds at least two adjacent basal planes of the same expanded graphite particle together. An amount of the expanded graphite particles can be 50 to 98 wt. %, based on the total weight of the carbon composite.

The second phase can further bond at least one basal plane of a graphite particle with at least one basal plane of a different graphite particle. An amount of the expanded graphite particles is 25 to 95 wt. %, based on the total weight of the carbon composite.

The second phase comprises a carbide of aluminum, titanium, nickel, tungsten, chromium, iron, an aluminum alloy, a copper alloy, a titanium alloy, a nickel alloy, a tungsten alloy, a chromium alloy, or an iron alloy, SiC, $B_4C$, or a carbonization product of a polymer. In addition to the second phase, the composite can also comprise a filler selected from $SiO_2$, Si, B, $B_2O_3$, a metal selected from aluminum, copper, titanium, nickel, tungsten, chromium, or iron, an alloy of the metal, or a combination comprising at least one of the foregoing.

In an embodiment, the second phase comprises a carbonization product of a crosslinked polymer. The crosslinked polymer is derived from a polyphenol, polyacrylonitrile, an epoxy resin, a rayon, a pitch, or a combination comprising at least one of the foregoing. The composite can also comprise a filler selected from $SiO_2$, Si, B, $B_2O_3$, a metal selected from aluminum, copper, titanium, nickel, tungsten, chromium, or iron, an alloy of the metal, or a combination comprising at least one of the foregoing. The carbon composite comprises 2 wt. % to 50 wt. % of the filler, 2 wt. % to 20 wt. % of the second phase, and 30 wt. % to 96 wt. % of the expanded graphite particles.

Articles can be made from the carbon composites. Thus, in an embodiment, an article comprises the carbon composite. The carbon composite may be used to form all or a portion of an article. Illustrative articles include seals, seal bore protector, swabbing element protector, components of frac plug, bridge plug, compression packing elements (premier seal), expanding packing elements (ARC seal), O-rings, bonded seals, bullet seals, subsurface safety valve (SSSV) dynamic seals, SSSV flapper seals, V rings, back up rings, drill bit seals, or ESP seals, The article can be a downhole element. In an embodiment, the article is a packer, a seal, or an O-ring.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A carbon composite comprising
a plurality of expanded graphite particles; and
a second phase comprising a carbide, a carbonization product of a polymer, or a combination thereof;
wherein the second phase bonds at least two adjacent basal planes of the same expanded graphite particle together.

2. The carbon composite of claim 1, wherein the second phase comprises a carbide of aluminum, titanium, nickel, tungsten, chromium, iron, an aluminum alloy, a copper alloy, a titanium alloy, a nickel alloy, a tungsten alloy, a chromium alloy, an iron alloy, SiC, $B_4C$, or a combination comprising at least one of the foregoing carbides.

3. The carbon composite of claim 1, wherein an amount of the expanded graphite particles is 50 to 98 wt. %, based on the total weight of the carbon composite.

4. The carbon composite of claim 1, wherein the second phase further bonds at least one basal plane of a graphite particle with at least one basal plane of a different graphite particle.

5. The carbon composite of claim 4, wherein the second phase comprises a carbide of aluminum, titanium, nickel, tungsten, chromium, iron, an aluminum alloy, a copper alloy, a titanium alloy, a nickel alloy, a tungsten alloy, a chromium alloy, an iron alloy, SiC, $B_4C$, or a combination comprising at least one of the foregoing carbides.

6. The carbon composite of claim 4, wherein an amount of the expanded graphite particles is 25 to 95 wt. %, based on the total weight of the carbon composite.

7. The carbon composite of claim 1, further comprising a filler selected from $SiO_2$, Si, B, $B_2O_3$, a metal selected from aluminum, copper, titanium, nickel, tungsten, chromium, or iron, an alloy of the metal, or a combination comprising at least one of the foregoing materials.

8. The carbon composite of claim 7, wherein the second phase comprises a carbonization product of a crosslinked polymer.

9. The carbon composite of claim 8, wherein the crosslinked polymer is derived from a polyphenol, polyacrylonitrile, an epoxy resin, a rayon, a pitch, or a combination comprising at least one of the foregoing.

10. The carbon composite of claim 8, wherein the carbon composite comprises 2 wt. % to 50 wt. % of the filler, 2 wt. % to 20 wt. % of the second phase, and 30 wt. % to 96 wt. % of the expanded graphite particles.

11. A method for the manufacture of a carbon composite of claim 1, the method comprising:
compressing a combination comprising expanded graphite particles and a filler to provide a pre-form; and
heating the pre-form to a temperature which is 20° C. to 100° C. higher than the melting point of the filler to form a second phase bonding at least two adjacent basal planes of the same expanded graphite particle together.

12. The method of claim 11, wherein the second phase further bonds at least one basal plane of a graphite particle with at least one basal plane of a different graphite particle.

13. The method of claim 11, wherein the heating is conducted for 30 minutes to 3 hours.

14. The method of claim 11, wherein the heating is conducted at a pressure of 5,000 psi to 30,000 psi.

15. The method of claim 11, wherein the filler is selected from $SiO_2$, Si, B, $B_2O_3$, a metal selected from aluminum, copper, titanium, nickel, tungsten, chromium, iron, an alloy of the metal, or a combination comprising at least one of the foregoing materials.

16. The method of claim 11, wherein the combination comprises 5 wt. % to 75 wt. % of the filler and 25 wt. % to 95 wt. % of the expanded graphite particles, based on the total weight of the combination.

17. A method for the manufacture of a carbon composite of claim 1, the method comprising:
providing a plurality of expanded graphite particles;
depositing a filler on a basal plane of an expanded graphite particle through vapor deposition to provide a filled-expanded graphite;
compressing the filled-expanded graphite to provide a pre-form; and
heating the pre-form to form a second phase bonding at least two adjacent basal planes of the same expanded graphite particle together.

18. The method of claim 17, wherein the deposition comprises physical vapor deposition, chemical vapor deposition, atomic layer deposition, laser vapor deposition, or plasma-assisted vapor deposition.

19. The method of claim 17, wherein the heating is conducted at a pressure of 5,000 psi to 30,000 psi.

20. The method of claim 17, wherein the heating is conducted at a temperature of 600 to 1000° C.

21. The method of claim 17, wherein the filler is selected from $SiO_2$, Si, B, $B_2O_3$, a metal selected from aluminum, copper, titanium, nickel, tungsten, chromium, iron, an alloy of the metal, or a combination comprising at least one of the foregoing materials.

22. A method for the manufacture of a carbon composite of claim 1, the method comprising:
compressing a combination comprising expanded graphite particles, a filler, a crosslinkable polymer, and a crosslinker to provide a pre-form;
crosslinking the crosslinkable polymer with the crosslinker to provide a composition comprising a crosslinked polymer; and heating the composition to form a carbonization product derived from the crosslinked polymer;

wherein the carbonization product bonds at least two adjacent basal planes of the same expanded graphite particle together; and the carbonization product further bonds at least one basal plane of a graphite particle with at least one basal plane of a different graphite particle.

23. The method of claim 22, wherein the crosslinkable polymer is selected from a polyphenol, polyacrylonitrile, an epoxy resin, a rayon, a pitch, or a combination comprising at least one of the foregoing, and wherein the crosslinker is selected from amines, cyclic acid anhydrides, and combinations comprising at least one of the foregoing.

24. The method of claim 22, wherein the combination comprises 2 wt. % to 50 wt. % of the crosslinkable polymer, 2 wt. % to 20 wt. % of the filler, and 30 wt. % to 96 wt. % of the expanded graphite particles.

25. An article comprising the carbon composite of claim 1.

26. The article of claim 25, wherein the article comprises seals, components of frac plug, bridge plug, packing elements, expanding packing elements, O-rings, bonded seals, bullet seals, subsurface safety valve dynamic seals, subsurface safety valve flapper seals, V rings, back up rings, drill bit seals, or ESP seals.

* * * * *